United States Patent [19]
Tsantrizos et al.

[11] Patent Number: 5,707,419
[45] Date of Patent: Jan. 13, 1998

[54] METHOD OF PRODUCTION OF METAL AND CERAMIC POWDERS BY PLASMA ATOMIZATION

[75] Inventors: Peter G. Tsantrizos, Westmount; François Allaire, Cap-de-la-Madeleine; Majid Entezarian, Montreal, all of Canada

[73] Assignees: Pegasus Refractory Materials, Inc.; Hydro-Quebec, both of Montreal, Canada

[21] Appl. No.: 515,425

[22] Filed: Aug. 15, 1995

[51] Int. Cl.$^6$ ........................................ B22F 9/14
[52] U.S. Cl. ............... 75/336; 75/338; 75/346; 264/10; 264/12
[58] Field of Search ............... 75/336, 338, 346; 264/10, 12

[56] References Cited

U.S. PATENT DOCUMENTS

| | | | |
|---|---|---|---|
| Re. 32,908 | 4/1989 | Pfender . | |
| 4,374,075 | 2/1983 | Yolton et al. | 75/346 |
| 4,642,207 | 2/1987 | Uda et al. | 264/10 |
| 4,812,166 | 3/1989 | Saiki et al. | 75/346 |
| 4,818,837 | 4/1989 | Pfender . | |
| 5,073,193 | 12/1991 | Chaklader et al. | 75/346 |
| 5,120,352 | 6/1992 | Jackson et al. | 75/346 |
| 5,147,448 | 9/1992 | Roberts et al. | 75/331 |
| 5,221,322 | 6/1993 | Tokuoka et al. | 75/346 |

FOREIGN PATENT DOCUMENTS

| | | | |
|---|---|---|---|
| 2801918 | 7/1979 | Germany | 75/336 |
| 49-25554 | 7/1974 | Japan | 75/336 |

OTHER PUBLICATIONS

Roberts, P.R. and P. Loewenstein, *Powder Metallurgy and Titanium Alloys*, Metall. Soc. of Aime, pp. 21–35 (1980).

Hofmann, M., W. Diemar, N. Ludwig and W.R. Zenker, *Powder Production and Spray Forming/Advances in Powder Metallurgy & Particulate Materials*, pp. 27–33 (1992).

Kohmoto, H., N. Murahashi and T. Kohno, *Powder Production and Spray Forming/Advances in Powder Metallurgy & Particulate Materials*, pp. 169–178, 1992.

Gerling, R., F.P. Schimansky and R. Wagner, *Powder Metallurgy and Spray Forming/Advances in Powder Metallurgy & Particulate Materials*, pp. 215–222 (1992).

Z.P. Lu and E. Pfender, "Synthesis of AlN Powder in a Triple Torch Plasma Reactor", (9th International Symposium on Plasma Chemistry, Pugnochiuso, Italy, vol. II, pp. 675–680, ed. R. d'Agostino, Sep. 1989.

*Primary Examiner*—George Wyszomierski
*Attorney, Agent, or Firm*—Oblon, Spivak, McClelland, Maier & Neustadt, P.C.

[57] ABSTRACT

A metal or an alloy thereof, or a ceramic that has a liquid phase is introduced in the form of a rod or a wire or as a liquid stream into the apex formed by a plurality of converging plasma jets. Atomization takes place and upon controlled cooling good quality spheroidal powders are obtained whose size varies generally between about 10 and 300 μm.

20 Claims, 2 Drawing Sheets

5,707,419

METHOD OF PRODUCTION OF METAL AND CERAMIC POWDERS BY PLASMA ATOMIZATION

BACKGROUND OF INVENTION (a) Field of the Invention

The present invention relates to a plasma atomization process. More particularly, the invention is concerned with a process for the production of spheroidal powders or consolidated shapes using plasma technology. In particular, according to the invention, the plasma jets produced by a plurality of plasma torches are caused to converge into an apex and the material which is intended to be treated and later convened into spheroidal powders or consolidated shapes is directed towards the apex formed by the converging plasma jets, wherein it is atomizer and thereafter converted into spheroidal powders or consolidated shapes by controlled cooling.

(b) Description of Prior Art

In many industrial applications, it is desirable to use relatively large (about 50 μm), spheroidal and fully densified powders. This applies to powders made from metals, or ceramics. Some of these powders are difficult to produce using conventional technology.

Atomization is defined as the breakup of a liquid into fine droplets. The breakup of the liquid can be accomplished by various techniques, including by impingement with water or gas (often called two-fluid atomization), centrifugal force, and exposure of molten metal containing dissolved gas to vacuum.

Plasma atomization is a two-fluid atomization process where the metal can be a molten stream, a wire or other feeds. Plasma atomization enables to melt and atomize metals simultaneously and to superheat the molten metal spray.

For some materials, such as Ti alloys, the ability to both melt and atomize the metal simultaneously offers significant advantages. Molten titanium reacts readily with the ceramic crucibles used to melt the metal prior to atomization and, thus, cannot be atomized using conventional technologies.

The plasma atomization technology is able to both melt and atomize a material which is fed into the converging plasma jets as a wire. As such, the technology eliminates the use of a crucible, and can be used to produce ceramic-free Ti alloy powders. By combining melting and atomization into one operation, plasma atomization is similar to the rotating electrode process developed by Nuclear Metals Inc. (Roberts, P. R. and P. Loewenstein, *Powder Metallurgy and Titanium Alloys*, Metall. Soc. of AIME, pp. 21–35 (1980)). However, while the rotating electrode process uses centrifugal force to break up the molten metal, plasma atomization is a two-fluid atomization process and, thus, can produce much finer powders.

In most two-fluid atomization methods, the atomizing fluid (air, inert gas, or water) is cold. As such, the molten metal particles may freeze rapidly into irregular shapes. Because it uses thermal plasma as the atomizing fluid, the present invention enables the molten metal particles to be superheated and cool slowly enough to assure complete spheroidization.

A number of technologies have been developed over the past decade aimed at producing ceramic-free Ti powders. Some techniques, such as the Electrode Introduction Melting-Gas Atomization Process (Hohmann. M., W. Diemar, N. Ludwig and W. R. Zanker, *Powder Production and Spray Forming/Advances in Powder Metallurgy & Particulate Materials*, pp. 27–39 (1992) eliminate the conventional ceramic crucible by melting a rod of Ti by induction just above the atomizing nozzle. Others, such as the Plasma Melt-Gas Atomization processes (Kohmoto, H., N. Murahashi and T. Kohno, *Powder Production and Spray Forming/Advances in Powder Metallurgy & Particulate Materials*, pp. 169–178 (1992) and Gerling, R., F. P. Schimansky and R. Wagner, *Powder Production and Spray Forming/Advances in Powder Metallurgy & Particulate Materials*, pp. 215–222 (1992)) being developed by many companies around the word, use a water cooled copper crucible and a plasma torch to melt Ti inside a cold Ti skull. Despite the development and commercialization of these technologies, high quality Ti powder remains very expensive.

An apparatus consisting of multiple converging torches has been taught by Z. P. Lu and E. Pfender in "Synthesis of AlN Powder in a Triple Torch Plasma Reactor" (9th International Symposium on Plasma Chemistry, Pugnochuiso, Italy, Vol. II, pp. 675–680, ed. R. d'Agostino). Their set up was used to create an expanded reaction zone for the synthesis of ultra fine AlN ceramic powders and diamond films. However, this type of approach has never been used for atomization or for the production of spherical particles larger than 10 μm.

It should be pointed out that in the plasma atomization process disclosed herein the kinetic energy of the plasma jets is used to produce the desired effect, i.e., disintegration of molten streams of metal, whilst in Lu and Pfender the thermal energy of the plasma is used for the chemical reaction.

Other references of interest include:
U.S. Pat. No. 5,147,448
U.S. Pat. No. 5,221,322
U.S. Pat. No. 5,120,352 all being directed to the production of metallic powders.

It is therefore an object of the present invention to provide a process which enables to produce metal, alloy or ceramic powders and which is efficient and economical.

It is another object of the present invention to provide a process which enables to spheroidize metal and ceramic powders having irregular morphology.

It is another object of the present invention to combine melting and atomization of metals and ceramics for the production of spheroidal particles.

It is another object of the present invention to utilize the plasma technology for the production of metal and ceramic powders and to give better spheroidization through the use of lower cooling rates.

It is another object of the present invention to create an atomizing fluid by means of multiple converging plasma jets, thereby solidifying the products in flight and form powders, or spray forming them onto a substrate where they solidify into consolidated shapes.

It is another object of the present invention to provide a process based on the plasma atomization technology where electrical energy is used to dramatically accelerate the plasma jets allowing for sufficient momentum at much lower mass flow rates.

SUMMARY OF INVENTION

These and other objects of the present invention may be achieved in a method for the production of substantially spheroidal powders or consolidated shapes of at least one material selected from the group consisting of metals, alloys and ceramics having a liquid phase. The method comprises:

(a) providing a plurality of plasma torches each delivering a jet of plasma,
(b) causing the jets of plasma to converge into an apex,
(c) directing a feed of the material into the apex,
(d) providing the jets of plasma with an amount of kinetic energy in the apex which is sufficient to cause atomization of the material,
(e) controlling the cooling rate of the atomized material as it exits from the apex at a rate of at least about $10^3$ degrees K/sec. to cause spheroidization of the atomized material and to produce the spheroidal powders or consolidated shapes.

Although a number of torches may be used to produce the apex, normally three plasma torches are used wherein the jets converge into the apex.

Preferably, the jets are equally distributed around a central axis to define angles of about 120° between one another and each forming an angle about 30° with respect to the central axis.

In accordance with one embodiment, the material is fed into the apex in the form of a molten stream of metal or ceramic. It may also be fed in the form of a continuous elongated shape, such as a rod or a wire.

In accordance with another embodiment, the method comprises melting the material in a furnace to produce a molten material and pouring the molten material through a nozzle, preferably made of graphite, provided in the furnace to give the molten stream of material.

In accordance with another embodiment, the method comprises pressing ceramic powders whose size is about 1 μm, into a rod, feeding the rod into the apex, and melting and atomizing the rod to form powders.

The starting material may consist of metals, such as aluminum, copper, nickel, titanium and alloys thereof. It may also consist of ceramics, such as oxides, carbides, borides and nitrides which have a liquid phase.

The continuous elongated shape, such as a rod or wire of the material, may be fed into the apex by means of a reeling device.

In accordance with a preferred embodiment, the atomized material is received in a cooling chamber wherein the cooling rate is adjusted to form spheroidal particles whose sizes may vary between about 10 and 300 p.m, preferably between 50 and 100 μm.

According to another embodiment, the atomized material is directed against a substrate to form a consolidated shape. The substrate may also be moved to form mill products.

According to another embodiment of the present invention, it is possible to feed irregularly shaped or agglomerated particles into the apex to form spheroidal and fully densed powders.

BRIEF DESCRIPTION OF DRAWINGS

The invention is illustrated but is not restricted by the annexed drawings in which.

DESCRIPTION OF PREFERRED EMBODIMENTS

Figure 1:
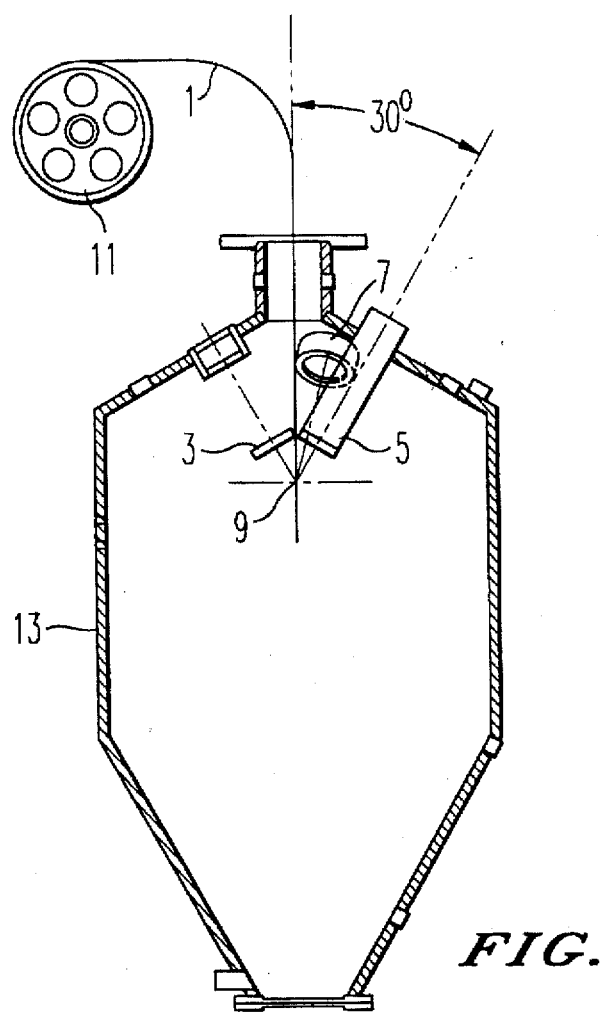
FIG. 1 is a schematic illustration of a plasma atomization system according to the invention.
Figure 4:
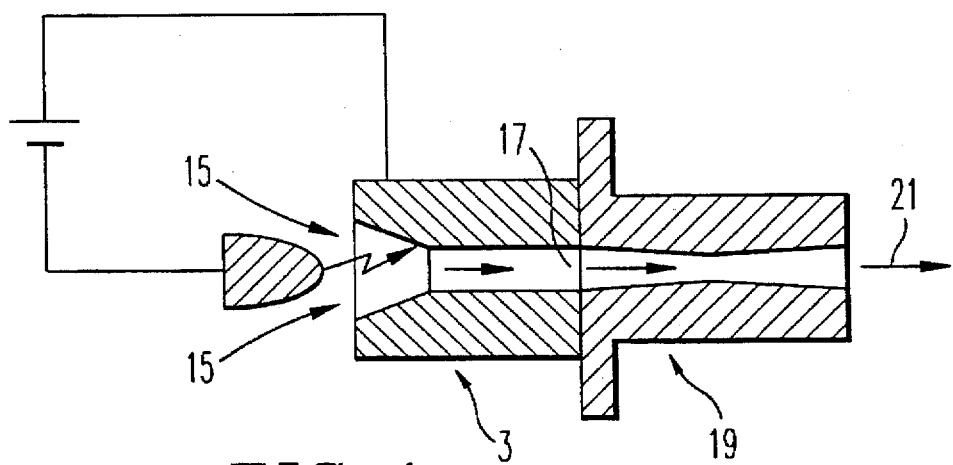
FIG. 4 is a cross-section view of a plasma torch provided with a high velocity nozzle.

Referring to the drawings, particularly FIG. 1, it will be seen that the plasma atomization system comprises three plasma torches 3, 5 and 7 arranged so that the jets produced by them converge into an apex 9 where the material, here an aluminum wire 1, is reeled from a spool 11 and directed into the apex 9. A water cooled chamber 13 where the cooling rate was adjusted to at least about $10^3$ K/sec is provided for the collection of powders. The three plasma torches are equally distributed to define angles of about 120° between one another and each forms an angle of 30° with respect to the axis of the feed.

The metal feeding mechanism may also consist of either a resistive heated or induction furnace, used to melt the metal and feed the molten stream into the chamber through a nozzle. Alternatively a powder feeder (not illustrated) may be used to feed irregularly shaped agglomerated powders into the apex for spheroidization or densification. Only the results obtained using the wire feeder or spool are described herein.

The plasma jets were generated by three non-transferred D.C. guns operating in the power range of 20 to 40 kW. The three jets converged into apex 9 where the metal was introduced.

Experiments revealed that the two important independent variables in the plasma atomization process are: (1) the wire feed rate, and (2) the torch power. These two factors determine where the wire melts. It was found that higher torch power and/or a slower wire feed rate cause the wire to melt before it reaches the apex of the converging plasma jets. Consequently, large droplets of molten metal form at the tip of the nozzle and decrease the atomization efficiency. In contrast, high feed rate and low torch power result in incomplete melting prior to atomization which produces elongated powder particles. In the system used according to the invention, satisfactory atomization results were obtained with Al at a power to weight ratio between 19 and 32 g/kW-hr.

The versatility of the process according to the invention allows a wide variety of materials to be atomizer. It covers both low melting point and refractory metals. In order to evaluate the versatility of the plasma atomization process, Al, Cu, Ni, Ti, and Cu 70—Ni 30 wires were atomized. For all of these atomization experiments argon was used as the plasma forming gas at a flow rate of 100 L/min. The total torch power was 83 kW (110 V and 250 A per torch). Table 1 shows the experimental conditions and the results obtained for each material atomizer by the process according to the invention.

TABLE 1

Results from the atomization of Al, Cu, Cu—Ni, Ni and Ti wires

| Material | Density (g/cm$^3$) | Melting point (°C.) | Wire diameter (cm) | Feed rate (g/min) | Average particle size (μm) |
|---|---|---|---|---|---|
| Al | 2.70 | 660 | 0.238 | 30.5 | 136 |
| Cu | 8.92 | 1083 | 0.238 | 90.7 | 94 |
| Cu70—Ni30 | 8.91 | 1250 | 0.159 | 26.7 | 107 |
| Ni | 8.90 | 1453 | 0.159 | 29.2 | 290 |
| Ti | 4.50 | 1660 | 0.159 | 14.7 | 189 |

Figure 2:
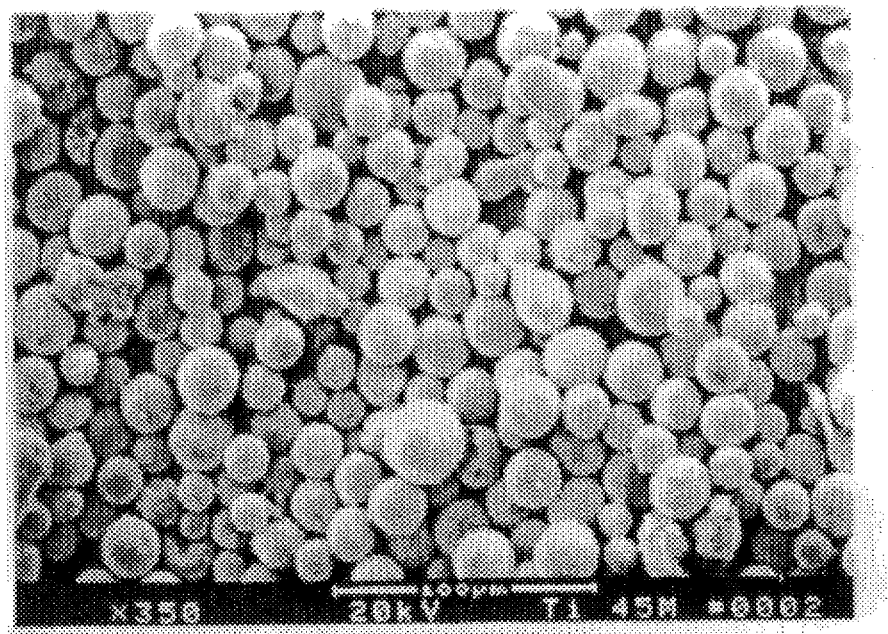
FIG. 2 is a micrograph of titanium powder (−45 μm) produced by the process according to the invention.
Figure 3:
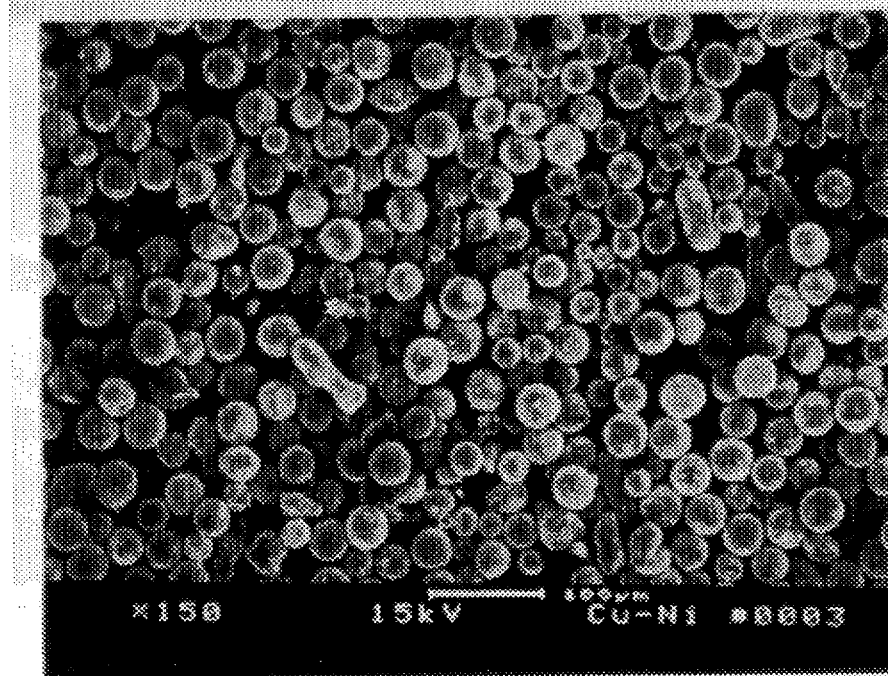
FIG. 3 is a micrograph of Cu—Ni powder (−45 μm) produced by the process according to the invention.

The secondary electron micrographs of the −45 μm fraction of the Ti and Cu—Ni powders are shown in FIGS. 2 and 3, respectively. It can be seen that the sphericity of both powders is excellent. The morphologies of both the Ti, and the Cu—Ni powders is comparable to the best commercial powders available. There are very few satellites attached to the produced powders according to the invention.

It was also found that the size of the reactor and the velocity of the plasma gas are other important parameters affecting the shape and size of the particles. It is believed that the process according to the invention will be able to produce consistently excellent quality powder with minimum ceramic contamination.

In another embodiment the plasma jet is accelerated through the use of a high velocity nozzle such as a LAVAL nozzle, which increases the momentum of the gas and facilitates the atomization. Plasma gas is introduced at 15 in plasma torch 3 where it first flows as a low velocity plasma jet 17 in the direction indicated. The plasma jet then flows into a high velocity nozzle 19, here a LAVAL nozzle, from where it exits at 21 as a high velocity plasma gas.

The need for high velocity plasma jets according to the present invention contrasts with the technique according to the Lu and Pfender where slow velocity is required to increase the residence time of the reactants and complete the reaction. In other words, the prior art is aimed at a chemical process whereas the present disclosure describes a mechanical process.

Although the invention has been described with reference to a preferred embodiment, it is understood that it is not limited thereto and that broader embodiments are within the scope of the present invention as defined in the appended claims.

We claim:

1. Method for the production of substantially spheroidal powders of at least one material selected from the group consisting of metals, alloys and ceramics having a liquid phase, which comprises:

(a) providing a plurality of plasma torches each delivering a jet;
   (b) causing said jets to converge into an apex;
   (c) directing a continuous feed of said at least one material into said apex;
   (d) providing said jets with sufficient kinetic energy in said apex to cause atomization of said at least one material into particles having a particle size of from 10 to 300 μm by said jets;
   (e) controlling cooling of atomized material as it exits from said apex at a rate of at least about $10^3$ K/sec. to cause spheroidization of said atomized material and to produce said substantially spheroidal powders.

2. Method according to claim 1, which comprises providing three plasma torches wherein the jets converge into said apex.

3. Method according to claim 2, wherein said jets are equally distributed around a central axis to define angles of about 120° between one another and each forming an angle of about 30° with respect to the central axis.

4. Method according to claim 1, which comprises feeding said at least one material into said apex in the form of a molten stream thereof.

5. Method according to claim 4, which comprises melting said at least one material in a furnace to produce a molten material and pouring said molten material through a nozzle provided in said furnace to give said molten stream of said at least one material.

6. Method according to claim 5, wherein said nozzle is made of graphite.

7. Method according to claim 1, which comprises feeding said at least one material into said apex in the form of a continuous elongated shape thereof.

8. Method according to claim 7, which comprises pressing ceramic powders whose size is about 1 μm into a rod, feeding said rod into said apex, and melting and atomizing said rod to form powders.

9. Method according to claim 7, wherein the continuous elongated shape is a wire which is fed into said apex for spheroidization thereof.

10. Method according to claim 7, wherein said continuous elongated shape is fed into said apex by means of a reeling device.

11. Method according to claim 1, wherein said material consists of one or more metals.

12. Method according to claim 11, wherein said one or more metals are selected from the group consisting of aluminum, copper, nickel, titanium and alloys thereof.

13. Method according to claim 1, wherein momentum of the plasma jet is adjusted to give particle sizes between about 50 and 100 μm.

14. Method according to claim 1, wherein said material comprises one or more ceramics.

15. Method according to claim 14, wherein said ceramics are selected from the group consisting of oxides, carbides, borides and nitrides which have a liquid phase.

16. Method according to claim 1, wherein said material is selected from the group consisting of metal and ceramic powders of irregular morphology, and atomized metal and ceramic powders are converted into spheroidal powders of regular morphology.

17. Method according to claim 16, wherein agglomerated metal and ceramic powders are fed into the apex under conditions to produce fully dense spherical particles of said material.

18. Method according to claim 1, wherein said plasma torches are each provided with a high velocity nozzle to increase momentum of the plasma jets and facilitate said atomization.

19. The method according to claim 1, wherein said method consists of steps a, b, c, d and e.

20. Method for the production of consolidated shapes of at least one material selected from the group consisting of metals, alloys and ceramics having a liquid phase, which comprises:

a) providing a plurality of plasma torches each delivering a jet;
   b) causing said jets to converge into an apex;
   c) directing a continuous feed of said at least one material into said apex;
   d) providing said jets with sufficient kinetic energy in said apex to cause atomization of said at least one material into particles having a particle size of from 10 to 300 μm by said jets;
   e) directing said atomized material against a cool substrate to form said consolidated shapes thereon.

* * * * *